United States Patent
Lee (10) Patent No.: US 8,273,476 B2
(45) Date of Patent: Sep. 25, 2012

(54) SECONDARY BATTERY WITH PROTECTION CIRCUIT MODULE

(75) Inventor: Sangjoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 390 days.

(21) Appl. No.: 12/654,157

(22) Filed: Dec. 11, 2009

(65) Prior Publication Data

US 2010/0178535 A1    Jul. 15, 2010

(30) Foreign Application Priority Data

Jan. 9, 2009   (KR) .................. 10-2009-0001871

(51) Int. Cl.
 *H01M 2/08*    (2006.01)
(52) U.S. Cl. .................. 429/185; 429/163; 429/164
(58) Field of Classification Search .................. None
See application file for complete search history.

(56) References Cited

U.S. PATENT DOCUMENTS

| | | | |
|---|---|---|---|
| 7,462,417 B2 | 12/2008 | Moon | |
| 2005/0089753 A1 | 4/2005 | Yoon | |
| 2005/0221174 A1 | 10/2005 | Yoon | |
| 2008/0118820 A1 | 5/2008 | Jang et al. | |
| 2008/0261087 A1 | 10/2008 | Jang et al. | |
| 2008/0274398 A1 | 11/2008 | Kim | |
| 2009/0111004 A1 | 4/2009 | Jang et al. | |
| 2009/0130554 A1 | 5/2009 | Jang et al. | |

FOREIGN PATENT DOCUMENTS

| | | | |
|---|---|---|---|
| JP | 2007-200630 | * | 8/2007 |
| KR | 1020050096291 A | | 10/2005 |
| KR | 1020060032591 A | | 4/2006 |
| KR | 1020090043381 A | | 5/2009 |
| KR | 1020090051590 A | | 5/2009 |

OTHER PUBLICATIONS

Machine translation of JP 2007-200630, retrived from <http://dossier1.ipdl.inpit.go.jp/AIPN/odse_top_fwi.ipdl?N0000=7401> on Mar. 1, 2012.*

* cited by examiner

*Primary Examiner* — Cynthia Lee
(74) *Attorney, Agent, or Firm* — Robert E. Bushnell, Esq.

(57) ABSTRACT

A secondary battery with a protection circuit module integrated with a structural reinforcing support. The secondary battery includes a bare cell, a protection circuit module. The protection circuit module includes a circuit board, and a structural reinforcing support coupling the bare cell and the circuit board of the protection circuit module. The structural reinforcing support is integrated with the protection circuit module in order to prevent separation of the protection circuit module from the bare cell.

16 Claims, 5 Drawing Sheets

SECONDARY BATTERY WITH PROTECTION CIRCUIT MODULE

CLAIM OF PRIORITY

This application makes reference to, incorporates the same herein, and claims all benefits accruing under 35 U.S.C. §119 from an application earlier filed in the Korean Intellectual Property Office on Jan. 9, 2009 and there duly assigned Serial No. 10-2009-0001871.

BACKGROUND OF THE INVENTION

1. Field of the Invention

Aspects of the present invention relate to a secondary battery with a protection circuit module.

2. Description of the Related Art

The recent rapid advances in the electronic, communication and computer industries have increased the use of portable electronic devices. Most of such portable electronic devices employ rechargeable secondary batteries as power sources.

Secondary battery packs are widely used at present in portable electronic devices. A typical battery pack has a structure in which a bare cell serving as an electric energy source and a protection circuit module (PCM) controlling the charging/discharging of the bare cell are combined into one unit. The protection circuit module usually includes a circuit board, on which various kinds of circuit devices are mounted, and electrode tabs coupled to the circuit board. The electrode tabs are joined to the bare cell by laser welding to electrically connect the circuit board and the bare cell. There is, however, the risk that the protection circuit module may be separated from the bare cell when the welded joints are damaged by an external impact. Thus, there is a need for a protection circuit module with an improved structure.

SUMMARY OF THE INVENTION

Aspects of the present invention provide a secondary battery with improved coupling between a protection circuit module and a bare cell.

An embodiment of the present invention provides a secondary battery comprising a bare cell, a protection circuit module including a circuit board, and a structural reinforcing support coupling the bare cell and the circuit board of the protection circuit module wherein the structural reinforcing support is integrated with the protection circuit module.

According to another aspect of the present invention, the structural reinforcing support may include a coupling plate coupled to the bare cell, first and second coupling flanges coupled to a first surface of the circuit board of the protection circuit module, and first and second support walls connecting the coupling plate and the respective first and second coupling flanges.

According to another aspect of the present invention, the circuit board may have an elongated shape extending along the lengthwise direction thereof, and the first and second support walls of the structural reinforcing support may face each other and may extend along the lengthwise direction of the circuit board.

According to another aspect of the present invention, the bare cell may include a stopper closing an electrolyte injection hole, and the coupling plate of the structural reinforcing support may have a through-hole at a position corresponding to the stopper of the bare cell.

According to another aspect of the present invention, the secondary battery may further comprise a top case coupled to the bare cell while accommodating the circuit board of the protection circuit module therein.

According to another aspect of the present invention, the circuit board of the protection circuit module may have first and second extension rods coupled to the respective first and second coupling flanges of the structural reinforcing support and extending parallel to each other, and a through-hole defined between the first and second extension rods to allow the coupling plate of the structural reinforcing support to be exposed therethrough.

According to another aspect of the present invention, the circuit board of the protection circuit module may have a connecting portion connecting the first and second extension rods.

According to another aspect of the present invention, the secondary battery may further comprise a resin molded part coupled to the bare cell while accommodating the protection circuit module and the structural reinforcing support therein, and at least one of the support walls of the structural reinforcing support may have at least one passage hole in which a resin of the resin molded part is filled.

According to another aspect of the present invention, the structural reinforcing support may be made by bending a metal plate member.

According to another aspect of the present invention, the structural reinforcing support may be joined to the circuit board of the protection circuit module by reflow soldering.

According to another aspect of the present invention, the structural reinforcing support may be joined to the bare cell by laser welding.

Additional aspects and/or advantages of the invention will be set forth in part in the description which follows and, in part, will be obvious from the description, or may be learned by practice of the invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 1:
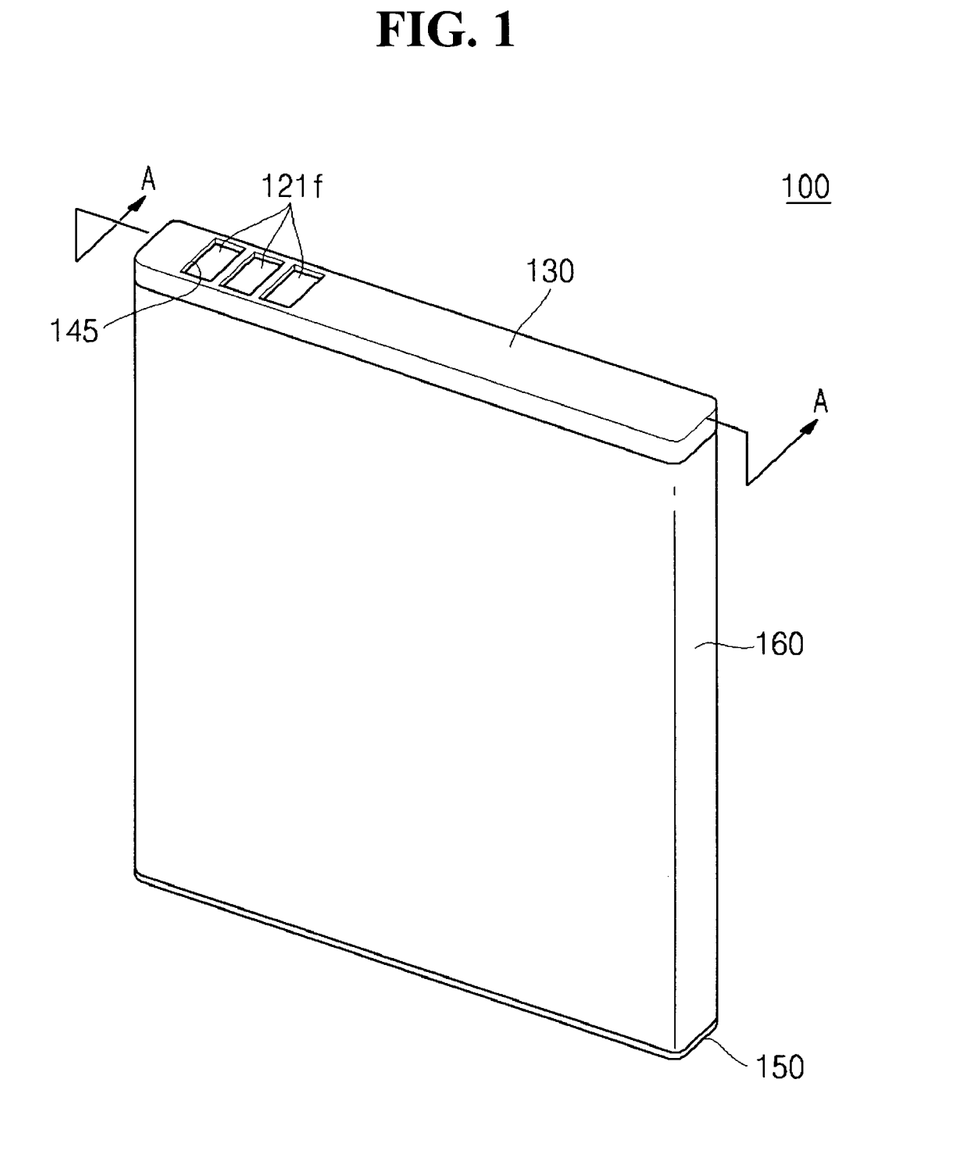
FIG. 1 is a perspective view of a secondary battery according to an embodiment of the present invention.
Figure 2:
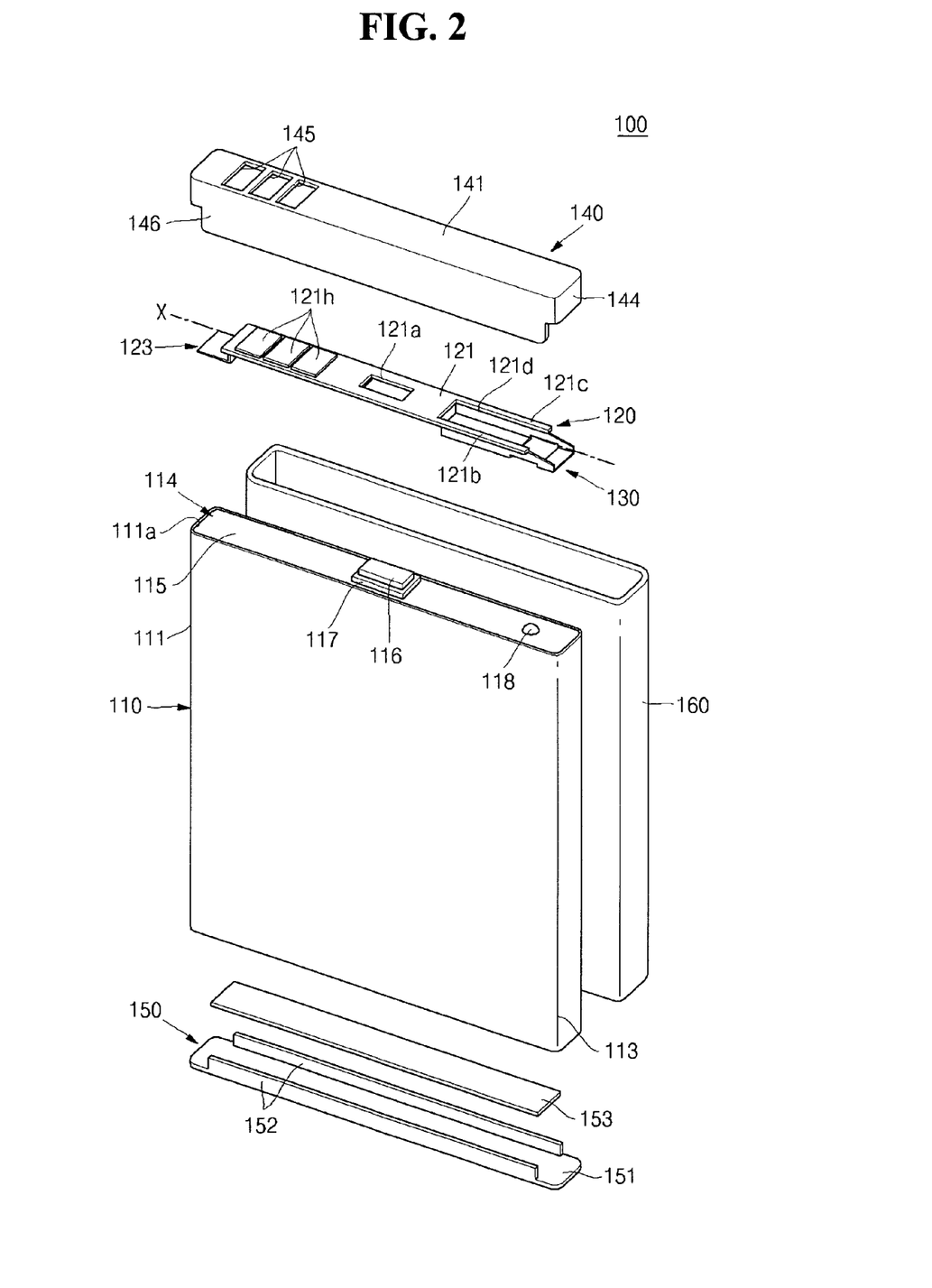
FIG. 2 is an exploded perspective view of the secondary battery of FIG. 1.
Figure 3:
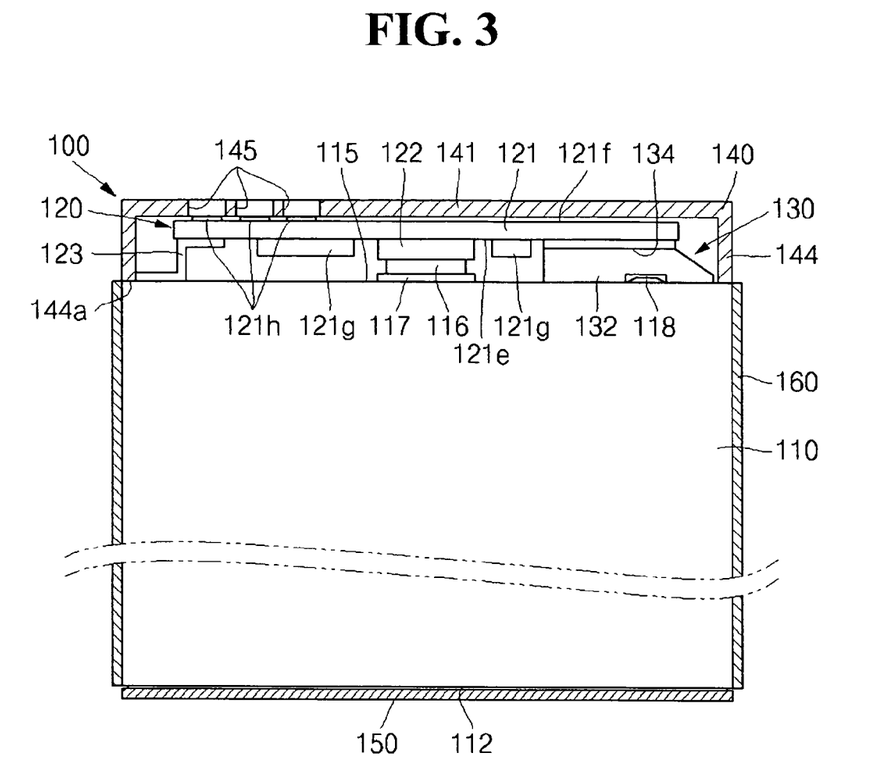
FIG. 3 is a front cross-sectional view taken along line A-A of FIG. 1 to illustrate a top case, a bottom case and a label of the secondary battery of FIG. 1.
Figure 4:
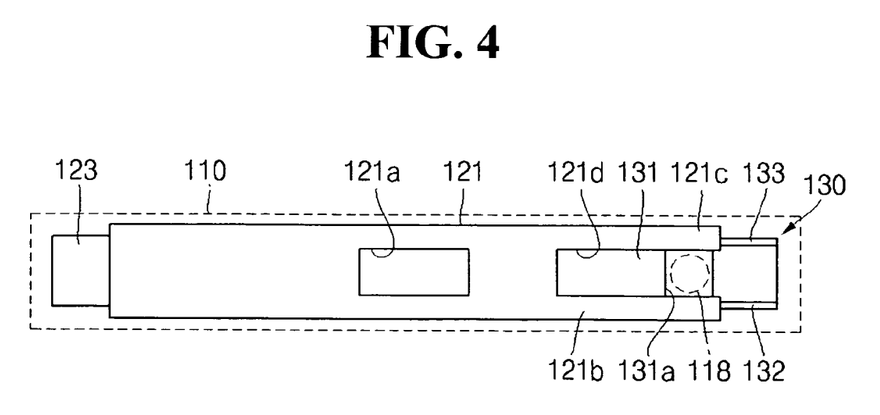
FIG. 4 is a plan view of a protection circuit module illustrated in FIG. 2.
Figure 5:
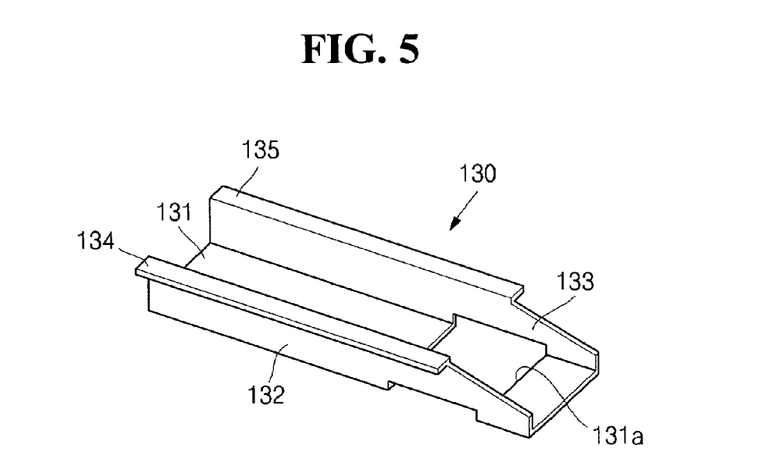
FIG. 5 is a perspective view of a structural reinforcing support illustrated in FIG. 2.

FIG. 1 is a perspective view of a secondary battery according to an embodiment of the present invention, FIG. 2 is an exploded perspective view of the secondary battery, FIG. 3 is a front cross-sectional view taken along line A-A of FIG. 1 to illustrate a top case, a bottom case and a label of the secondary battery, FIG. 4 is a plan view of a protection circuit module illustrated in FIG. 2, and FIG. 5 is a perspective view of a structural reinforcing support illustrated in FIG. 2.

Referring to FIGS. 1 through 5, the secondary battery 100 comprises a bare cell 110, a protection circuit module 120, a structural reinforcing support 130, a top case 140, a bottom case 150, and a label 160.

The bare cell 110 serves as an electric energy source and includes an electrode assembly (not shown), a can having an opening 111a through which the electrode assembly is accommodated therein, and a cap assembly 114 adapted to cover the opening 111a of the can 111.

Although not shown, the electrode assembly is produced by rolling a positive electrode plate, a negative electrode plate and a separator interposed between the electrode plates. Positive and negative electrode tabs are coupled to the positive and negative electrode plates, respectively.

The can 111 is a metal container and has an opening 111a at the upper end thereof. The can 111 has a substantially hexahedral shape. The can 111 provides a space where the electrode assembly and an electrolyte are accommodated. Also, the can 111 is electrically connected to the positive electrode tab to function as a positive terminal. The can 111 is made by processing a metal, such as aluminum or its alloy, by any suitable process, preferably deep drawing. The can 111 consists of a bottom plate 112 in a substantially rectangular shape and side walls 113 extending upwardly from the edges of the bottom plate 112.

The cap assembly 114 consists of a cap plate 115 and an electrode terminal 116. The cap plate 115 has a substantially rectangular shape and is adapted to close the opening 111a formed at the upper end of the can 111. The cap plate 115 is made of an electrically conductive metal such as aluminum or its alloy. The positive electrode tab of the electrode assembly is electrically connected to the cap plate 115 to allow the cap plate 115 to function as a positive terminal. The electrode terminal 116 is substantially positioned at a center of the cap plate 115 and penetrates the cap plate 115. An insulating gasket 117 surrounds the electrode terminal 116 to insulate the electrode terminal 116 from the cap plate 115. The cap plate 115 is formed with an electrolyte injection hole (not shown) through which an electrolyte is injected into the can 111. A stopper 118 protrudes from the cap plate 115 to close the electrolyte injection hole. A negative electrode tab of the electrode assembly is electrically connected to the electrode terminal 116 to allow the electrode terminal 116 to function as a negative terminal. Although the cap plate 115 functions as a positive terminal and the electrode terminal 116 functions as a negative terminal in this embodiment, it will be appreciated by those skilled in the art that the cap plate 115 can function as a negative terminal and the electrode terminal 116 can function as a positive terminal when the positive and negative electrode tabs of the electrode assembly are connected to the electrode terminal 116 and the cap plate 115, respectively.

The protection circuit module 120 includes a circuit board 121, a first electrode tab 122 and a second electrode tab 123. The protection circuit module 120 is coupled to the bare cell 110 to control the operations (including charge/discharge operation) of the secondary battery 100.

The circuit board 121 is a printed circuit board having an interconnection pattern. The circuit board 121 has a thin plate shape that is elongated and extends along the x-axis direction. Welding of the first electrode tab 122 is performed through a first through-hole 121a formed at the central portion of the circuit board 121. A first extension rod 121b and a second extension rod 121c extend parallel to each other from one end of the circuit board 121 along the lengthwise (i.e. x-axis) direction of the circuit board 121. The structural reinforcing support 130 is coupled to the first and second extension rods 121b and 121c. Welding of the structural reinforcing support 130 is performed through a second through-hole 121d defined between the first and second extension rods 121b and 121c. The circuit board 121 has a first surface 121e and a second surface 121f opposite to the first surface 121a. The first electrode tab 122 is coupled to the central portion of the first surface 121e, and the second electrode tab 123 and the structural reinforcing support 130 are coupled to both ends of the first surface 121e. The first surface 121e faces and is spaced from the cap plate 115 of the bare cell 110. Electrical circuit devices 121g are mounted on the first surface 121e of the circuit board 121. The electrical circuit devices 121g may be a control IC, a charge/discharge switch, and the like. Outer terminals 121h are formed on the second surface 121f of the circuit board 121. The outer terminals 121h are electrically connected to external devices (e.g., an external load and a charger).

The first electrode tab 122 is made of an electrically conductive material such as nickel and serves to electrically connect the circuit board 121 to the bare cell 110. The first electrode tab 122 is positioned corresponding to the first through-hole 121a of the circuit board 121. The first electrode tab 122 is welded to the electrode terminal 116 of the bare cell 110.

The second electrode tab 123 is positioned at one end of the circuit board 121 in the lengthwise direction. The second electrode tab 123 serves to electrically connect the circuit board 121 to the bare cell 110. The second electrode tab 123 is made of an electrically conductive material such as nickel. The second electrode tab 123 is welded to the cap plate 115 of the bare cell 110.

The structural reinforcing support 130 includes a coupling plate 131, first and second support walls 132 and 133, and first and second coupling flanges 134 and 135. The structural reinforcing support 130 serves to maintain a state in which the protection circuit module 120 is fixedly coupled to the bare cell 110. The structural reinforcing support 130 is made by bending a metal plate member and is integrally joined to the circuit board 121 of the protection circuit module 120 by any suitable method such as reflow soldering. The structural reinforcing support 130 may be made of a highly electrically conductive material (e.g., nickel). In this case, the structural reinforcing support 130 may function as an electrode tab to electrically connect the circuit board 121 and the bare cell 110.

The coupling plate 131 has a substantially rectangular shape and is joined to the cap plate 115 of the bare cell 110 by laser welding. The coupling plate 131 is entirely exposed through the second through-hole 121d of the circuit board 121, which enables welding over the entire surface of the coupling plate 131 to enhance the coupling between the protection circuit module 120 and the bare cell 110. The coupling plate 131 is formed with a through-hole 131a. The cap 118 protruding from the cap plate 115 of the bare cell 110 is positioned in the through-hole 131.

The first support wall 131 and the second support wall 133 face each other and extend upwardly from both sides of the coupling plate 131. The first surface 121e of the circuit board 120 is spaced an appropriate distance from the cap plate 115 of the bare cell 110 by the first and second support walls 132 and 133. The first and second support walls 132 and 133 extend along the lengthwise (i.e. x-axis) direction of the circuit board 121.

The first and second coupling flanges 134 and 135 extend outwardly from the first and second support walls 132 and 133, respectively. The first and second coupling flanges 134 and 135 are coupled to the first and second extension rods 121b and 121c of the circuit board 121 of the protection circuit module 120, respectively.

The top case 140 accommodates the protection circuit module 120 in an inner space thereof to protect the protection circuit module 120. The top case 140 includes a cover plate 141 and side walls 144 extending downwardly from the cover plate 141.

The cover plate 141 has a shape substantially corresponding to the shape of the cap plate 115 of the bare cell 110. The cover plate 141 is formed with through-holes 145. The outer terminals 121h of the protection circuit module 120 are exposed to the outside through the through-holes 145. The inner surface of the cover plate 141 is in contact with the second surface 121f of the circuit board 121 of the protection circuit module 120.

The distal ends 144a of the side walls 144 are in contact with the cap plate 115 of the bare cell 110 and support the top case 140. An outer circumferential portion of the distal ends 144a of the side walls 144 extends downwardly to form an extension portion 146. The extension portion 146 covers a portion of the side walls 113 of the can 111.

The bottom case 150 includes a bottom plate 151 and two extensions 152 extending upwardly from the bottom plate 151. The bottom plate 151 has substantially the same shape as the bottom plate 112 of the bare cell 110 and is attached to the bottom plate 112 of the bare cell 110 by means of an adhesive member 153. The extensions 152 cover lower portions of the side walls 113 of the can 111.

The label 160 is attached so as to surround the side walls 113 of the bare cell 110. The label 160 covers the extension portion 146 of the top case 140 and the extensions 152 of the bottom case 150.

Figure 6:
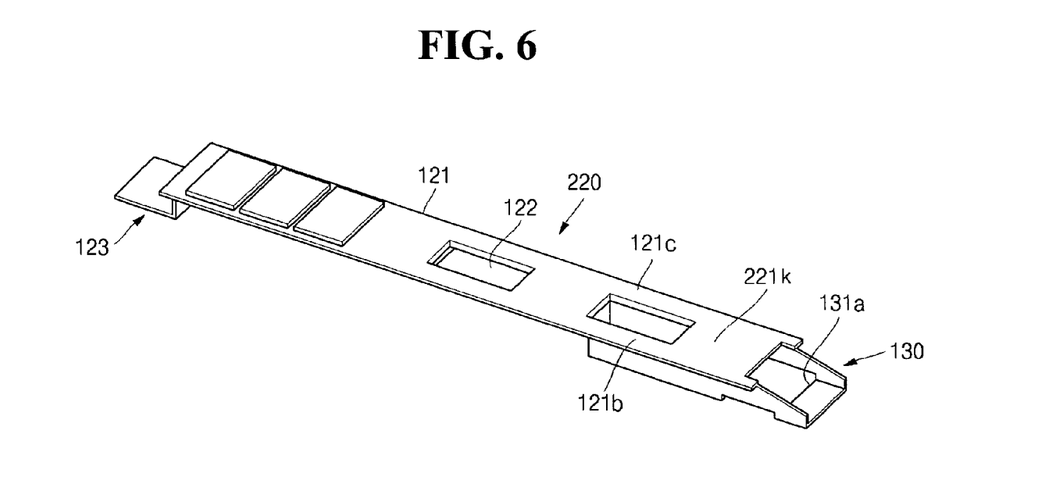
FIG. 6 is a perspective view of another embodiment of a circuit board illustrated in FIG. 2.

Next, a description will be given of a protection circuit module 220 according to another embodiment of the present invention. FIG. 6 illustrates a structural reinforcing support 130 together with the protection circuit module 220. Referring to FIG. 6, the protection circuit module 220 includes a circuit board 221, a first electrode tab 122 and a second electrode tab 123. The circuit board 221 has a first extension rod 121b, a second extension rod 121c and a connecting portion 221k structurally connecting the two extension rods. The circuit board 221 is structurally enhanced by the connecting portion 221k. The connecting portion 221k is formed at a position of the circuit board 121 corresponding to a through-hole 131a of the structural reinforcing support 130, where welding is not performed. The construction of the circuit board 221 is the same as that of the circuit board 121 illustrated in FIG. 2 except the connecting portion 221k, and a detailed description thereof is omitted herein.

Next, a secondary battery according to another embodiment of the present invention will be explained. A perspective view of the secondary battery is illustrated in FIG. 7, and a perspective view of a structural reinforcing support of the secondary battery is illustrated in FIG. 8.

Figure 7:
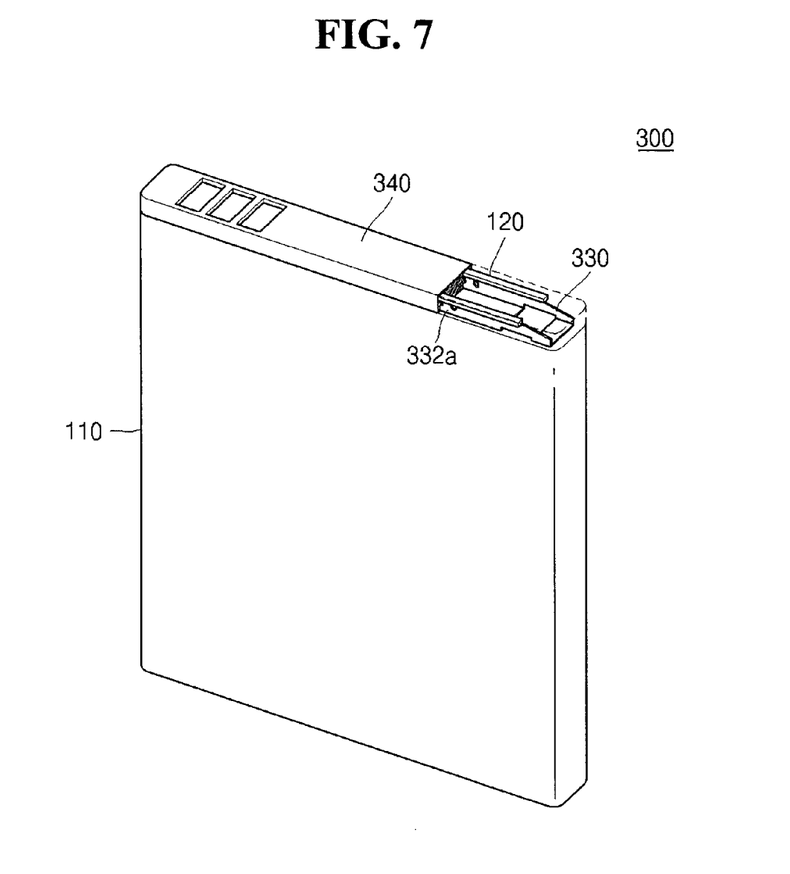
FIG. 7 is a partially cut-away perspective view of a secondary battery, from which a portion of a molded part is removed, according to another embodiment of the present invention.

Referring to FIG. 7, the secondary battery 300 comprises a bare cell 110, a protection circuit module 120, a structural reinforcing support 330, and a resin molded part 340. The constructions of the bare cell 110 and the protection circuit module 120 are the same as in the embodiment illustrated in FIG. 2, and a detailed description thereof is omitted.

Figure 8:
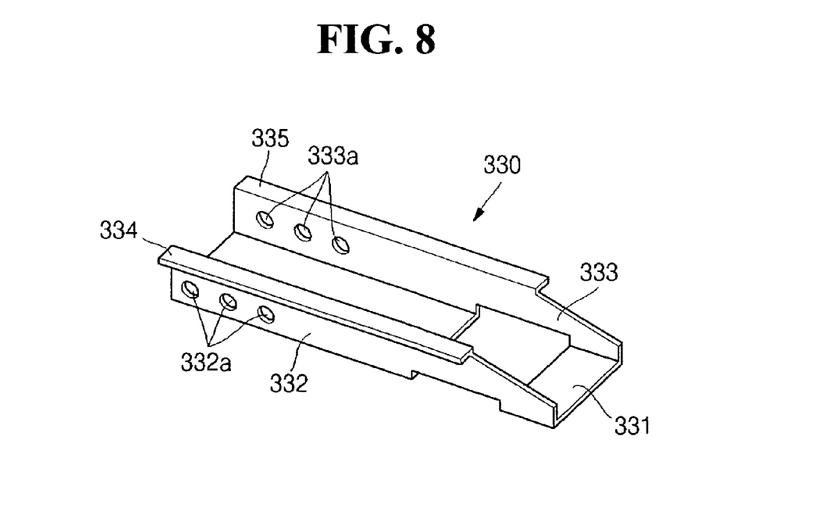
FIG. 8 is a perspective view of a structural reinforcing support illustrated in FIG. 7.

Referring to FIGS. 7 and 8, the structural reinforcing support 330 includes a coupling plate 331, first and second support walls 332 and 333, and first and second coupling flanges 334 and 335. The first support wall 332 has a plurality of passage holes 332a and the second support wall 333 has a plurality of passage holes 333a. A resin of the resin molded part is filled in the passage holes 332a and 333a to further fixedly couple the protection circuit module 120 to the bare cell 110. The construction of the structural reinforcing support 330 is the same as the structural reinforcing support 130 illustrated in FIG. 5 except the passage holes 332a and 333a, and a detailed description thereof is omitted.

The resin molded part 340 is coupled to an upper portion of the bare cell 110 while accommodating the protection circuit module 120 and the structural reinforcing support 330 therein. The resin of the resin molded part 340 is filled in the passage holes 332a and 333a of the structural reinforcing support 330 to ensure strong bonding between the resin molded part 340 and the structural reinforcing support 330.

As is apparent from the above description, according to these aspects of present invention, the structural reinforcing support integrated with the circuit board of the protection circuit module is coupled to the bare cell to enhance the coupling between the protection circuit module and the bare cell.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery comprising:
a bare cell;
a protection circuit module including a circuit board; and a structural reinforcing support coupling the bare cell and the circuit board of the protection circuit module,
wherein the structural reinforcing support is integrated with the protection circuit module,
wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges,
wherein the circuit board has an elongated shape extending along the lengthwise direction thereof, and the first and second support walls of the structural reinforcing support face each other and extend along the lengthwise direction of the circuit board.

2. A secondary battery comprising:
a bare cell;
a protection circuit module including a circuit board; and
a structural reinforcing support coupling the bare cell and the circuit board of the protection circuit module,
wherein the structural reinforcing support is integrated with the protection circuit module,
wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges,
wherein the bare cell includes a stopper closing an electrolyte injection hole, and the coupling plate of the structural reinforcing support has a through-hole at a position corresponding to the stopper of the bare cell.

3. The secondary battery of claim 1, further comprising a top case coupled to the bare cell while accommodating the circuit board of the protection circuit module therein.

4. A secondary battery comprising:
a bare cell;
a protection circuit module including a circuit board; and
a structural reinforcing support coupling the bare cell and the circuit board of the protection circuit module,
wherein the structural reinforcing support is integrated with the protection circuit module,
wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges,
wherein the circuit board of the protection circuit module has first and second extension rods coupled to the respective first and second coupling flanges of the structural reinforcing support and extending parallel to each other, and a through-hole defined between the first and second extension rods to allow the coupling plate of the structural reinforcing support to be exposed therethrough.

5. The secondary battery of claim 4, wherein the circuit board of the protection circuit module has a connecting portion connecting the first and second extension rods.

6. A secondary battery comprising:
a bare cell;
a protection circuit module including a circuit board; and
a structural reinforcing support coupling the bare cell and the circuit board of the protection circuit module,
wherein the structural reinforcing support is integrated with the protection circuit module,
wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges,
wherein the secondary battery further comprises a resin molded part coupled to the bare cell while accommodating the protection circuit module and the structural reinforcing support therein, and at least one of the support walls of the structural reinforcing support has at least one passage hole in which a resin of the resin molded part is filled.

7. The secondary battery of claim 1, wherein the structural reinforcing support is made by bending a metal plate member.

8. The secondary battery of claim 1, wherein the structural reinforcing support is joined to the circuit board of the protection circuit module by reflow soldering.

9. The secondary battery of claim 1, wherein the structural reinforcing support is joined to the bare cell by laser welding.

10. A secondary battery comprising:
a bare cell;
a protection circuit module including a circuit board; and
a structural reinforcing support coupling the bare cell and the circuit board of the protection circuit module,
wherein the structural reinforcing support is attached to the protection circuit module by reflow soldering or bending the portion of the structural reinforcing support,
wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges,
wherein the circuit board has an elongated shape extending along the lengthwise direction thereof, and the first and second support walls of the structural reinforcing support face each other and extend along the lengthwise direction of the circuit board.

11. A secondary battery comprising:
a bare cell;
a protection circuit module including a circuit board; and
a structural reinforcing support coupling the bare cell and the circuit board of the protection circuit module,
wherein the structural reinforcing support is attached to the protection circuit module by reflow soldering or bending the portion of the structural reinforcing support,
wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges,
wherein the bare cell includes a stopper closing an electrolyte injection hole, and the coupling plate of the structural reinforcing support has a through-hole at a position corresponding to the stopper of the bare cell.

12. The secondary battery of claim 10, further comprising a top case coupled to the bare cell while accommodating the circuit board of the protection circuit module therein.

13. A secondary battery comprising:
a bare cell;
a protection circuit module including a circuit board; and
a structural reinforcing support coupling the bare cell and the circuit board of the protection circuit module, wherein the structural reinforcing support is attached to the protection circuit module by reflow soldering or bending the portion of the structural reinforcing support, wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges, wherein the circuit board of the protection circuit module has first and second extension rods coupled to the respective first and second coupling flanges of the structural reinforcing support and extending parallel to each other, and a through-hole defined between the first and second extension rods to allow the coupling plate of the structural reinforcing support to be exposed therethrough.

14. The secondary battery of claim 13, wherein the circuit board of the protection circuit module has a connecting portion connecting the first and second extension rods.

15. A secondary battery comprising:
a bare cell;
a protection circuit module including a circuit board; and
a structural reinforcing support coupling the bare cell and the circuit board of the protection circuit module, wherein the structural reinforcing support is attached to the protection circuit module by reflow soldering or bending the portion of the structural reinforcing support, wherein the structural reinforcing support includes a coupling plate coupled to the bare cell, first and second coupling flanges coupled to a first surface of the circuit board of the protection circuit module, and first and second support walls connecting the coupling plate and the respective first and second coupling flanges, wherein the secondary battery further comprises a resin molded part coupled to the bare cell while accommodating the protection circuit module and the structural reinforcing support therein, and at least one of the support walls of the structural reinforcing support has at least one passage hole in which a resin of the resin molded part is filled.

16. The secondary battery of claim 10, wherein the structural reinforcing support is joined to the bare cell by laser welding.

\* \* \* \* \*